Aug. 30, 1960 R. DE GAILLARD 2,951,231

METHODS OF AND DEVICES FOR MAGNETICALLY STORING INFORMATION

Filed March 31, 1955 2 Sheets-Sheet 1

Inventor
R. de Gaillard
By Glascock Downing & Seebold
Attys.

Aug. 30, 1960 R. DE GAILLARD 2,951,231

METHODS OF AND DEVICES FOR MAGNETICALLY STORING INFORMATION

Filed March 31, 1955 2 Sheets-Sheet 2

Inventor
R. de Gaillard
By Glascock Downing & Seebold
Attys.

United States Patent Office 2,951,231

Patented Aug. 30, 1960

2,951,231

METHODS OF AND DEVICES FOR MAGNETICALLY STORING INFORMATION

Robert de Gaillard, Paris, France, assignor to Societe Anonyme Asservelec, Paris, France Filed Mar. 31, 1955, Ser. No. 498,335

Claims priority, application France Apr. 6, 1954

5 Claims. (Cl. 340—172.5)

The invention relates to methods of and devices for recording discrete frequencies on magnetic supports and restoring these frequencies for the electromagnetic control of exploiting devices.

In the known methods employed for this purpose, use is made of magnetic supports of indefinite length which in principle travel at substantially uniform speeds both during recording and during restoration, which speeds may, however, differ from one another between the recording and the restoration.

Methods of and devices for correcting the small speed variations which may occur in the course of either operation are also known.

Methods and devices are also known for the utilisation of a frequency, called the reference frequency, for rendering the reading speed dependent upon the recording speed.

One object of the present invention is to render possible the application of the known methods and devices in the case of discontinuous magnetic supports, which are in principle of short length and adapted to move, mainly in the course of the recording, at discontinuous speeds and/or at speeds which may be subject to very great variations.

According to the first improvement affecting the recording stage, the coding frequencies and the control frequency known as the reference frequency, instead of being emitted and then recorded on a magnetic support, will be separately read on magnetic supports on which they will have been previously recorded and, as the result of this reading, will be simultaneously recorded on the magnetic support which will be subsequently used for the restoration.

According to a second improvement affecting the restoring stage, the reading of the coding and reference frequencies forms the subject of an intermediate recording on a continuous variable-speed support, the speed of travel of which in the second reading may be more readily adjusted and rendered uniform than could the speed of travel of the discontinuous support, the translational movement of which will generally be controlled by devices having greater inertia and having to satisfy other requirements.

An embodiment of the underlying idea of the invention will hereinafter be described by way of example, but it is not applicant's intention to limit the generic scope of his invention to the specific features and details of the example chosen for the illustration.

Figure 1:
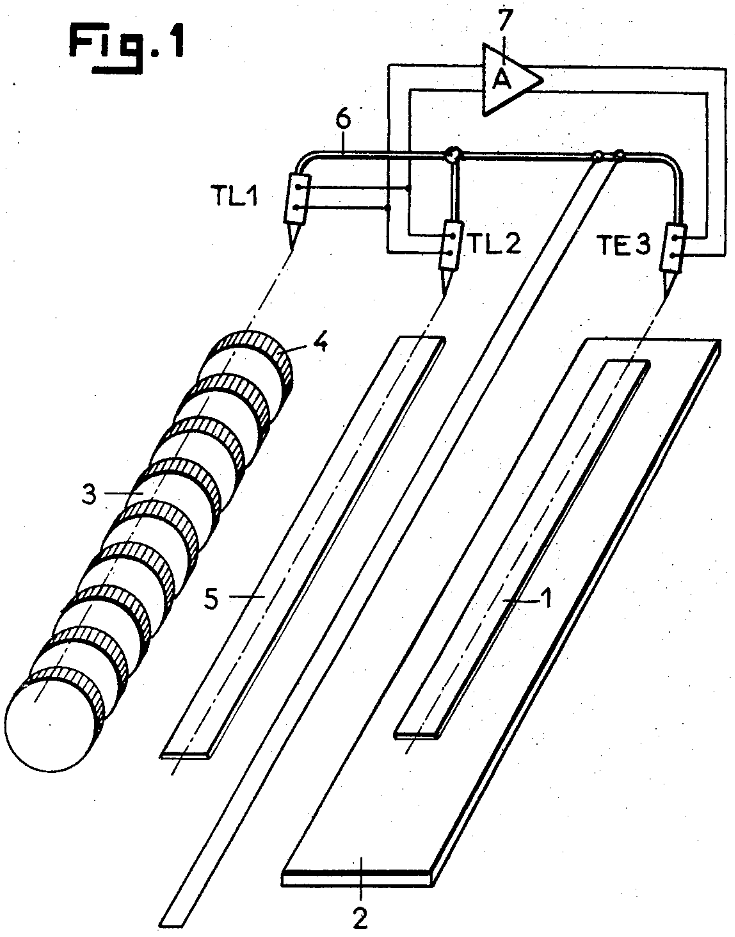
Figure 1 shows the recording device in very diagrammatic form.

Since only means known per se and in current use are employed in carrying the invention into effect, the devices are only defined by their functions without any details of their operation or of their mechanical, electrical or electromechanical form being given.

In the present example, it has been assumed that the support for the information consists of a length of magnetic film 1 of commercially obtainable form, stuck or secured by any appropriate means to a metal plate 2, which may be, for example, of the type usually employed in addressing machines and which bear, for example on the reverse side, the name and address of the client of a bank, the momentary state of whose current account will be recorded, in the form hereinafter described, on the magnetic support 1.

The coder designated as a whole by 3 consists of an assembly of nine coding wheels assuming that the information which is to be provided on the film 1 is at most a nine-digit number. Strips 4 of magnetic film are stuck or otherwise secured on the peripheries of these wheels. The wheels are of equal diameter and coaxial and are controlled by the usual control devices employed in computing machines. Moreover, they may form part of a computing machine, as will hereinafter be explained.

Recorded on the strips of film 4 are frequencies or frequency combinations corresponding univocally to the ten-digits which may enter into the composition of the number which is to be recorded on the support 1.

The said frequencies are recorded in the direction of the generatrices of the cylinder formed by the assembly of wheels, which recording may precede or, preferably, succeed the fixing of the strips 4 on the coding wheels.

In any case, the ten positions which each wheel may occupy under the action of the control device must be conjugate with those which may be occupied by the other wheels in order that the nine frequencies corresponding to a number may be aligned on a common generatrix in each of the possible positions.

Disposed on any plane support, which is preferably parallel to the plane of the surface of the plate 2, is a magnetic support consisting of a length of magnetic film 5, on which is permanently recorded the frequency which has been chosen as the reference frequency. The length of the film 5 is at least equal to, and preferably greater than, the length of a genetratrix of the cylinder 3. Finally, the longitudinal axes of symmetry of the films 1 and 5 are parallel to the generatrices of the cylinder 3.

Fixed on a support consisting of a bar 6 transverse in relation to the direction of the generatrices of the cylinder 3 are scanning heads $TL^1$ and $TL^2$ and a recording head $TE^3$, the said heads being disposed at a suitable level to enable them to follow the upper generatrix of the cylinder 3, the centre axis of the film 5 and the centre axis of the film 1 respectively. Finally, the bar 6 may be actuated with a translational movement in the direction of the generatrices of the cylinder 3 by a device of any known form, which is not shown.

The operation is as follows:

By operation of the keys controlling the position of the coder 3, the nine frequencies or frequency combinations corresponding to the digits of the number to be recorded are brought on to the upper generatrix of the cylinder.

At this instant, the movement of the bar 6, which has been advanced in relation to the position which it occupies in Figure 1, is tripped so that, in the translational movement, the head $TL^1$ reads from left to right the frequencies which are recorded on the coding wheels along the upper generatrix of the cylinder 3.

At the same time, the scanning head $TL^2$ reads the reference frequency recorded on the film 5. The coding and reference frequencies are transmitted into the mixer-amplifier 7 and are directed from the output of this device to the recording head $TE^3$, which records them on the magnetic film 1. There are thus recorded on the said film the coding frequencies and, by super-imposition, the reference frequency. It will be assumed that the keyboard controlling the positioning of the wheels of the coder 3 comprises a key which controls the translational movement of the bar 6 for the purpose of the recording, and a key which controls the return after the recording.

Figure 2:
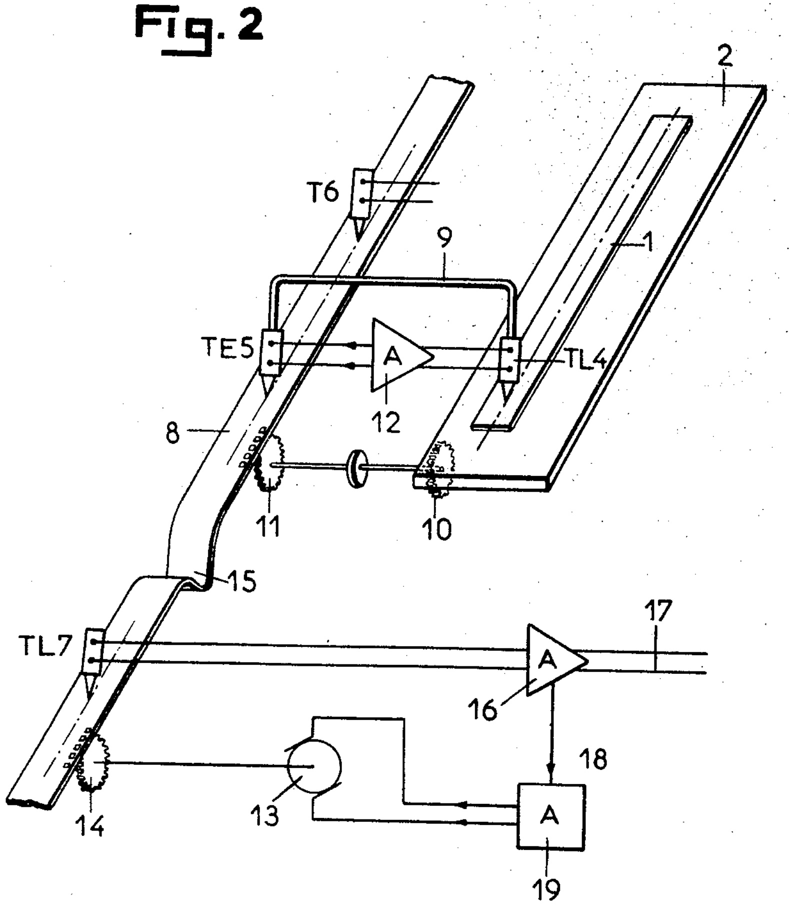
Figure 2 shows the restoring device in very diagrammatic form.

Figure 2, which illustrates the restoring assembly, again shows the magnetic film 1, which is assumed to bear a recording and which is supported by the plate 2 in the exploiting position. The said plate is assumed to form part of a device (not shown) by which it is moved. In the said device, the successive plates are successively brought into the exploiting position, if desired with the aid of a selecting device which stops a selected plate in the exploiting position or allows it to travel past without stopping it.

The said selecting devices are currently employed in addressing machines, and the present invention is completely independent thereof.

Situated parallel to the surface of the plate 2 is a magnetic film 8 mounted on a support which is adapted to impart a translational movement thereto. The film 8 may be of indefinite length or it may consist of a strip closed on itself.

The scanning head $TL^4$ and the recording head $TE^5$ are fixed at an appropriate level to a bar 9 forming a support, so that the first may read the frequencies registered on the film 1 and the second may re-record them on the film 8.

The directions of movement of the plates 2 and of the film 8 are parallel to one another and the movements are interdependent, this interdependence being symbolically indicated in the diagram by the toothed wheels 10 and 11, the wheel 10 being driven by the plate or by the device driving the plate, and the wheel 11 driving the film 8 or at least controlling the movement of the device driving the film 8. The speeds of movement of the plates 2 and of the film 8 are not necessarily equal provided that they remain in a constant ratio. Finally, the frequencies read by the head $TL^4$ are transmitted to the recording head $TL^5$ through the amplifier 12. If the film 8 is a strip closed on itself, an erasing head $T^6$ will be disposed on the input side of $TE^5$.

A scanning head $TL^7$ is situated at a point further ahead in the direction of movement of the film 8. In the region in which this scanning head operates, the film 8 is driven by an independent motor 13 which acts on a driving device symbolically represented by the wheel 14. A degree of slack symbolically indicated at 15 exists in the length of the film between the region in which the head $TE^5$ operates and the region in which the head $TL^7$ operates. In fact, the driving speeds of the film 8 in these two regions are not necessarily equal at any given instant, but the mean speeds must be equal, the momentary difference being compensated for by the slack 15.

The frequencies read by the head $TL^7$ are transmitted into an amplifier-detector 16 which separates the coding frequencies sent into a circuit 17, on the one hand, and the reference frequency sent into a circuit 18 on the other hand. Beyond the amplifier-detector 16, the means employed are those known in the art for controlling the scanning speed as a function of the reference frequency. For this purpose, the circuit 18 controls the speed of the motor 13, through the assembly 19. This assembly has the object of adjusting the speed of the said motor, for example by acting on the excitation or the setting of the brushes. The assembly 19 has not been described, since it is of known form.

In addition, the circuit 17 is the receiving circuit by means of which a receiving device is electromechanically controlled, the said receiving device being, for example, a printing device which will consist, for example, of nine printing wheels or nine wheels associated with a computing machine, the respective positions of which will be controlled by the detected frequencies.

With the device hereinbefore described, it is furthermore possible to print, for example, on a docket or a slip the client's name and address which have been registered permanently on the plate 2, as well as the state of the current bank account as read by the head $TL^4$ on the film 1 or as converted during its passage through the computing machine controlled by the circuit 17, to which computing machine there will also have been supplied a number corresponding to the variation of the account, which number must be added to or subtracted from the previous state of the account as read by the head $TL^4$.

If, after this operation, it is desired to record on the support 1 the new state of the account, it will be sufficient to dispose at a point further ahead in the direction of movement according to Figure 2 a second assembly similar to that illustrated in Figure 1. In this case, the wheels of the coder 3 will obviously be controlled by the computing machine which is controlled by the circuit 17. Naturally, there must be provided between the two successive positions occupied by the plate 2 an erasing head which will remove the former state of the account before the new state is recorded.

In the example hereinbefore described, a frequency or a combination of frequencies corresponds to each digit of the coder.

However, another known method of storing information may be employed, in which only ten frequencies corresponding to the ten digits from 0 to 9 are employed, the rank being characterised by the duration of the emission of the frequencies, or a single frequency may be employed for each of the wheels of the coder 3, the ten digits from 0 to 9 being distinguished by the duration of the emission of the frequency.

I claim:

1. For the reproduction of coded frequencies and of a reference frequency recorded on a magnetic carrier while said carrier is in movement at non uniform speed, a system of apparatus comprising in combination said magnetic carrier, a second magnetic flexible carrier, means for simultaneously reproducing the recorded frequencies from the first carrier and recording the reproduced frequencies on the second carrier, said first means to impart to said flexible carrier at the level of said recording head, a movement having a speed bearing a constant ratio with the speed of the movement of the first carrier, a scanning head to scan the second carrier at a point further ahead in the direction of movement of said second carrier and second means independent of the first means to impart a movement at uniform speed to said second carrier at the level of said scanning head whereby said uniform speed may be regulated independently from the first recited speed.

2. A system according to claim 1 in which the means to impart a movement at uniform speed to the second carrier includes means to separate the reference frequency and means to correct said uniform speed by means of said reference frequency.

3. System for the recording, in a first stage, of information by means of frequencies according to a predetermined code simultaneously with a reference frequency and for the reproduction of said coded frequencies and of said reference frequency in a second stage by means of an apparatus according to claim 1 including in the first stage at least a first magnetic carrier recorded with the frequencies of the code, a second magnetic carrier recorded with the reference frequency means for imparting a movement at uniform speed to the second carrier including means for separating the reference frequency and means to correct said uniform speed by means of said reference frequency, a third magnetic carrier, reproducing means to reproduce selectively the frequencies of the code from the first and simultaneously the reference frequency from the second carrier and recording means to record simultaneously on the third carrier the frequencies from said first and second carrier.

4. A system according to claim 3 in which the first magnetic carrier comprises a magnetic strip, a cylinder on the periphery of which said strip is fixed, the frequencies of the predetermined code being respectively recorded on the carrier along the generatrices of the cylinder, and means to rotate said cylinder and to impart to said cylinder a definite number of predetermined positions.

5. A system according to claim 4 comprising a battery of first magnetic carriers, in which the cylinders are equal in diameter and coaxial, the respective frequencies of the predetermined code recorded on the strips being recorded, for a predetermined angular position of the cylinders, along a generatrix of the geometrical cylinder formed by the assembly of the cylinders.

References Cited in the file of this patent

UNITED STATES PATENTS

| | | |
|---|---|---|
| 2,587,532 | Schmidt | Feb. 26, 1952 |
| 2,656,419 | Dingley | Oct. 20, 1953 |
| 2,685,079 | Hoeppner | July 27, 1954 |
| 2,713,677 | Scott | July 19, 1955 |
| 2,721,990 | McNaney | Oct. 25, 1955 |